United States Patent [19]
Nishimoto et al.

[11] Patent Number: 5,629,252
[45] Date of Patent: May 13, 1997

[54] METHOD FOR MANUFACTURING A DIELECTRIC CERAMIC COMPOSITION DIELECTRIC CERAMIC AND MULTILAYER HIGH FREQUENCY DEVICE

[75] Inventors: Keiji Nishimoto; Hiroshi Kagata; Junichi Kato; Tatsuya Inoue, all of Osaka, Japan

[73] Assignee: Matsushita Electric Industrial Co., Ltd., Japan

[21] Appl. No.: 662,700

[22] Filed: Jun. 13, 1996

[30] Foreign Application Priority Data

Jun. 15, 1995 [JP] Japan ................... 7-148494

[51] Int. Cl.$^6$ ................... C04B 35/46; H01G 4/12
[52] U.S. Cl. ................... 501/136; 361/321.2; 361/321.5
[58] Field of Search ................... 501/136; 361/321.2, 361/321.5

[56] References Cited

U.S. PATENT DOCUMENTS

| | | | |
|---|---|---|---|
| 5,248,640 | 9/1993 | Sano et al. ................... | 501/138 |
| 5,273,944 | 12/1993 | Kagata et al. ................... | 501/135 |
| 5,484,753 | 1/1996 | Kagata et al. ................... | 501/136 |
| 5,525,562 | 6/1996 | Kagata et al. ................... | 501/136 |

FOREIGN PATENT DOCUMENTS 4-065021  3/1992  Japan ................... H01B 3/12

*Primary Examiner*—Deborah Jones
*Attorney, Agent, or Firm*—Merchant, Gould, Smith, Edell, Welter & Schmidt

[57] ABSTRACT

A dielectric ceramic composition that can be sintered at a low temperature of around 1000° C. and also can have a high dielectric constant, a high Q value and small temperature coefficient at a resonant frequency includes a glass component that promotes sintering. The dielectric ceramics include: the main component comprising calcium oxide, magnesium oxide, niobium oxide and titanium oxide and expressed by the Formula: $Ca\{(Mg_{1/3}Nb_{2/3})_{1-x}Ti_x\}O_3$ (wherein X is more than 0 not more than 0.50) within the range of not less than 40 parts by weight nor more than 98 parts by weight; the accessory component comprising at least one selected from $SiO_2$ and $B_2O_3$ within the range of not less than 2 parts by weight nor more than 60 parts by weight; and at least one oxide selected from the group consisting of MgO, NiO, CuO, $MNO_2$ and $WO_3$ within the range of not less than 0.1 parts by weight nor more than 10 parts by weight. Consequently, the dielectric ceramic composition of the present invention can be sintered at low temperature. The dielectric ceramic composition also has a stability in composition and high Q value, which can used for the dielectric ceramic and multilayer high frequency device.

6 Claims, 4 Drawing Sheets

METHOD FOR MANUFACTURING A DIELECTRIC CERAMIC COMPOSITION DIELECTRIC CERAMIC AND MULTILAYER HIGH FREQUENCY DEVICE

FIELD OF THE INVENTION

This invention relates to dielectric ceramic and multilayer high frequency devices used for various filters and resonators using high frequency.

BACKGROUND OF THE INVENTION

Recently, communication systems using electromagnetic waves in the microwave range, such as automobile phones, portable telephones, satellite broadcasting systems or the like have been developed so that miniaturization of their terminal apparatus have been required. In order to miniaturize the terminal apparatus, each part of apparatus needs to be miniaturized. In such apparatus, the dielectric ceramic is placed in a frequency stabilizing device of various filters and oscillators. When the resonant mode is the same, the size of these resonant devices is inversely proportional to the square root of the dielectric constant ($\epsilon_r$) of the dielectric materials to be used. Consequently, in order to make miniature resonant devices, materials having a high dielectric constant are needed. Other required properties of the dielectric ceramic include: having a low loss in a microwave range, in other words, having a high Q value; and having a small temperature coefficient at a resonant frequency ($\tau_r$). As a material having a high dielectric constant, a (Pb, Ca) $ZrO_3$ system is disclosed in Japanese Laid-Open Patent No. (Tokkai-Hei) 4-65021. This system has a high dielectric constant ($\epsilon_r$) of more than 100, a high Q value of approximately 800 at 2-4 GHz and a small temperature coefficient at a resonant frequency.

Meanwhile, attempts have been made to miniaturize resonance devices and to improve the function by making a multilayer structure of conductor and dielectric ceramic. Since a conductor to be used in such a high-frequency range as microwave is required to have a high conductivity, Cu, Au, Ag or an alloy of them need to be used. In the case of making the dielectric ceramic multilayer structure, dielectric ceramic is required to be burned at the same time when the conductive metal is burned. The heat of the sintering operation acts on the conductive metal as well as the ceramic, so that the sintering conditions must be mild enough that the metal does not melt or oxidize. In other words, the dielectric ceramic is required to be densely sintered at temperatures below the melting points of the conductive metals to be used (the melting point of Cu is 1083° C., that of Au is 1063° C., that of Ag is 961° C.). Furthermore, if the Cu is used for the electrode, the dielectric ceramic is required to be burnt at low oxygen partial pressure. As a microwave dielectric ceramic that can be sintered at low temperature, a $Bi_2O_3$-$CaO$-$Nb_2O_5$ system is disclosed in Japanese Laid-Open Patent No. (Tokkai-Hei) 5-225826.

Although the $Bi_2O_3$-$CaO$-$Nb_2O_5$ system ceramic can be sintered at a low temperature around 1000° C., $Bi_2O_3$ of the main component evaporates during burning. Thus, the dielectric property is unstable with respect to the burning temperature. In general, when the resonant device is further miniaturized, the Q value drops. Therefore, suitable materials having a high Q value are still needed.

SUMMARY OF THE INVENTION

The object of the present invention is to solve the above-mentioned problems and to provide the dielectric ceramic that is sinterable at lower temperatures, stable in composition, and has a high Q value. Mother object of the present invention is to provide the method of manufacturing the dielectric ceramic and also provide a multilayer high frequency device using the dielectric ceramic.

In order to accomplish these and other objects and advantages, the dielectric ceramic composition of the present invention provides the following components: the main component comprising calcium oxide, magnesium oxide, niobium oxide and titanium oxide, and expressed by the Formula: $Ca\{(Mg_{1/3}Nb_{2/3})_{1-x}Ti_x\}O_3$ (wherein X is more than 0 not more than 0.50) within the range of not less than 40 parts by weight nor more than 98 parts by weight; the accessory component comprising at least one selected from $SiO_2$ and $B_2O_3$ within the range of not less than 2 parts by weight nor more than 60 parts by weight; and at least one oxide selected from the group consisting of MgO, NiO, CuO, $MnO_2$ and $WO_3$ within the range of not less than 0.1 parts by weight nor more than 10 parts by weight.

It is preferable in the dielectric ceramic composition of the present invention that the dielectric constant ($\epsilon_r$) ranges from 10 to 50.

It is preferable in the dielectric ceramic composition of the present invention that the Qf product is not less than 1000 GHz nor more than 30000 GHz.

It is preferable in the dielectric ceramic composition of the present invention that the temperature coefficient at a resonant frequency is not less than −50 ppm/° C. nor more than +50 ppm/° C.

According to the method of manufacturing the dielectric ceramic of the present invention, the dielectric ceramic is provided by sintering the dielectric ceramic composition. The above-mentioned dielectric ceramic composition comprises: the main component comprising calcium oxide, magnesium oxide, niobium oxide and titanium oxide and expressed by the Formula: $Ca\{(Mg_{1/3}Nb_{2/3})_{1-x} Ti_x\}O_3$ (wherein X is more than 0 and not more than 0.50) within the range of not less than 40 parts by weight nor more than 98 parts by weight; the accessory component comprising at least one selected from $SiO_2$ and $B_2O_3$ within the range of not less than 2 parts by weight nor more than 60 parts by weight; and at least one oxide selected from the group consisting of MgO, NiO, CuO, $MnO_2$ and $WO_3$ within the range of not less than 0.1 parts by weight nor more than 10 parts by weight. This method comprises the procedure of preheat treating a mixture of the accessory component and additive before sintering.

It is preferable in the method of the present invention that the temperature for the preheat treatment ranges from 500° to 900° C.

It is preferable in the method of the present invention that the preheat treatment includes the procedures of melting at a temperature within the range of 1000° C. to 1200° C. and quenching after melting.

It is preferable in the method of the present invention that the sintering temperature ranges from 800° to 1200° C.

It is preferable in the method of the present invention that the main component is calcined at the temperature of 1000° C.–1300° C. and then ground fine.

It is preferable in the method of the present invention that the preheat treatment includes the procedures of: melting the accessory component at a temperature of 1000° C.–1200° C.; quenching it; and then grinding it fine.

According to the multilayer high frequency device of the present invention comprising conductor and dielectric; all or some of the conductor is composed by Cu, Cu alloy, Au, Au alloy, Ag, and Ag alloy; all or some part of the dielectric is composed of the dielectric ceramic composition comprising: the main component comprising calcium oxide, magnesium oxide, niobium oxide and titanium oxide and expressed by the Formula: $Ca\{(Mg_{1/3}Nb_{2/3})_{1-x}Ti_x\}O_3$ (wherein X is more than 0 and not more than 0.50) within the range of not less than 40 parts by weight nor more than 98 parts by weight; the accessory component comprising at least one selected from $SiO_2$ and $B_2O_3$ within the range of not less than 2 parts by weight nor more than 60 parts by weight; and at least one oxide selected from the group consisting of MEO, NiO, CuO, $MnO_2$ and $WO_3$ within the range of not less than 0.1 parts by weight nor more than 10 parts by weight.

It is preferable in the multilayer high frequency device that dielectric constant ($\epsilon_3$) ranges from 10 to 50.

It is preferable in the multilayer high frequency device that the Qf product is not less than 1000 GHz nor more than 30000 GHz.

According to the dielectric ceramic composition of the present invention in which the main component comprising calcium oxide, magnesium oxide, niobium oxide and titanium oxide and expressed by the Formula: $Ca\{(Mg_{1/3}Nb_{2/3})_{1-x}Ti_x\}O_3$ (wherein X is more than 0 not more than 0.50) is present within the range of not less than 40 parts by weight nor more than 98 parts by weight; the accessory component comprising at least one selected from $SiO_2$ and $B_2O_3$ is present within the range of not less than 2 parts by weight nor more than 60 parts by weight; and at least one oxide selected from the group consisting of MgO, NiO, CuO, $MnO_2$ and $WO_3$ is present within the range of not less than 0.1 parts by weight nor more than 10 parts by weight: there can be provided the dielectric ceramic composition capable of being sintered at a low temperature, being stable in composition and having a higher Q value. In other words, since $Ca\{(Mg_{1/3}Nb_{2/3})_{1-x}Ti_x\}O_3$ having an excellent microwave dielectric property is used as the main component, and furthermore, since glass components which improve sintering are contained as the accessory component, there can be provided the dielectric ceramic sinterable at temperatures around 1000° C. and having a high dielectric constant, a high Q value and a small temperature coefficient at a resonant frequency. Moreover, since $Bi_2O_3$ is not contained as the main component, the dielectric ceramic is stable in composition and excellent in the stability of the dielectric property with respect to the burning temperature.

The method for manufacturing the dielectric ceramic composition of the present invention permits manufacturing the dielectric ceramics efficiently and reasonably.

According to the multilayer high frequency device of the present invention, the above-mentioned dielectric ceramic composition is used for the dielectric layer and Cu, Au, Ag, or alloys of them are used for the conductor. As a result, a miniature and high performanced high frequency device can be provided.

DETAILED DESCRIPTION OF THE PRESENT INVENTION

Figure 1:
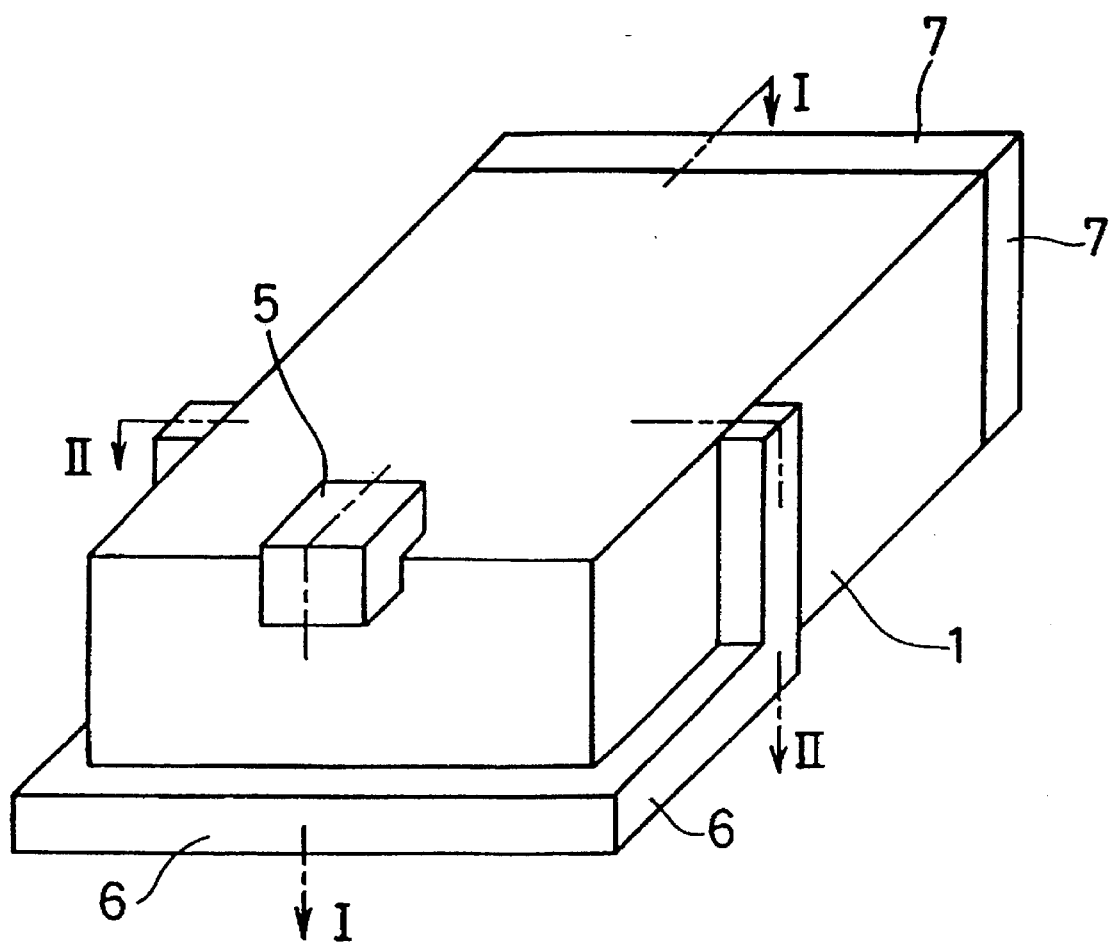
FIG. 1 is a perspective view of the dielectric resonator of Example 4 of the present invention.

This invention will be explained in detail with reference to the following examples.

EXAMPLE 1

In example 1 is described a preferred embodiment to illustrate the dielectric ceramics composition of the present invention. The powder used for the main component is synthesized as follows. As initial materials, compounds of chemical purity (chemical purity hereinafter represents not less than 99 wt. % purity), such as $CaCO_3$, MgO, $Nb_2O_5$ and $TiO_2$ were used. The purity of the materials was checked, and then the materials were weighed so as to make composition expressed by $Ca\{(Mg_{1/3}Nb_{2/3})_{1-x}Ti_x\}O_3$ wherein X is value shown in Tables. Moreover, the powder was blended with zirconia balls and pure water by means of a ball mill for 17 hours. The milled slurry was dried and calcined in the melting pot made of alumina at temperatures of 1000° C.–1300° C. for 2 hours. The calcined product was milled by the use of the above-mentioned ball mill for 17 hours and dried so that the powder of the main component was made.

The powder used for the accessory component is synthesized as follows. As initial materials, compounds of chemical purity such as $SiO_2$, $B_2O_3$, $Al_2O_3$, $ZrO_2$, $BaCO_3$, $SrCO_3$, $CaCO_3$, $Li_2O$, ZnO, and PbO were used. The purity of these materials was checked and then the materials were weighed so as to make compositions shown respectively in Table 1. Moreover, the powder was blended with ethanol as solvent by using a ball mill and then dried. The blended powder was melted in a melting pot at the temperatures of 1000° C.–1200° C. and then quenched. After being milled, the blended powder was milled in the same manner as blending and then dried so that the powder of the accessory component was made. After milling, the particle size of the powder was less than 50 μm. The composition of the synthesized accessory component is shown in Table 1.

TABLE 1

| Sample NO. | Composition of Accessory component (parts by weight) | | | | | | | | | |
|---|---|---|---|---|---|---|---|---|---|---|
| | $SiO_2$ | $B_2O_3$ | $Al_2O_3$ | $ZrO_2$ | BaO | SrO | CaO | $Li_2O$ | ZnO | PbO |
| A | 50 | | | | 20 | | | 10 | | 20 |
| B | | 60 | | | | 10 | | | 10 | 20 |
| C | 50 | 30 | 20 | | | | | | | |
| D | 45 | 27 | 20 | 3 | 5 | | | | | |
| E | 45 | 26 | 20 | 3 | | | 5 | 1 | | |

TABLE 1-continued

| Sample NO. | Composition of Accessory component (parts by weight) | | | | | | | | | |
|---|---|---|---|---|---|---|---|---|---|---|
| | $SiO_2$ | $B_2O_3$ | $Al_2O_3$ | $ZrO_2$ | BaO | SrO | CaO | $Li_2O$ | ZnO | PbO |
| F | 45 | 27 | 20 | 3 | 5 | | | | | |
| G | 55 | 20 | 15 | 4 | | 6 | | | | |

As the additives, the powder of high chemical purity such as MgO, NiO, CuO, $MnO_2$, $WO_3$ was weighed so as to make the same composition as that shown in Tables 2 and 3. The additives were wet-milled in the ball mill with the powders of the main component and the accessory component and then dried. The powder was mixed with 6 wt. % of polyvinyl alcohol solution (of 5 wt. % in concentration) as a binder and granulated by sieving through 32 mesh screen. The granulated powder was press-molded into a disk of 13 mm in diameter and approximately 5 mm in thickness at a molding pressure of 100 MPa. After the molded product was heated at the temperature of 600° C. for 3 hours to remove binders, the molded product was placed in a closed magnesia magnetic vessel, retained at various temperatures within the range of 800° C.–1200° C. for 2 hours and burned. The microwave dielectric property of the sintered product, which was burnt at the temperature showing the maximum density, was measured. The dielectric constant of the sample was calculated by means of the resonant frequency of $TE_{011}$ mode and sample state. At that time the sample was picked up and held by a parallel conductive plate, The resonant frequency and the Q value were measured by putting samples on the supporting base in the cavity by the dielectric resonator method of $TE_{01\delta}$ mode. As a result, the resonance frequency was 4–8 GHz. The resonant frequencies at temperatures of −25° C., 20° C., and 85° C. were measured respectively and then the temperature coefficients ($\tau_f$) were calculated by the least square method. The results are shown in the Table 2 and 3.

TABLE 2

| | Composition | | | | | | Sintering | Dielectric property | | |
|---|---|---|---|---|---|---|---|---|---|---|
| | Main component | | Accessory Component | | Additives | | | | | |
| Sample No | X | parts by wt. | Mark | parts bu wt. | element | parts by wt. | temperature °C. | $\epsilon r$ | Qf product GHz | $\tau f$ ppm/°C. |
| 1# | 0.0 | 80 | D | 20 | | 0 | 900 | 14 | 4500 | −41 |
| 2 | 0.0 | 80 | D | 20 | CuO | 2 | 875 | 14 | 4800 | −40 |
| 3# | 0.3 | 80 | D | 20 | | 0 | 900 | 22 | 3800 | −3 |
| 4 | 0.3 | 80 | D | 20 | CuO | 0.1 | 875 | 22 | 4000 | −3 |
| 5 | 0.3 | 80 | D | 20 | MgO | 2 | 875 | 21 | 4300 | −2 |
| 6 | 0.3 | 80 | D | 20 | NiO | 2 | 875 | 21 | 4300 | −4 |
| 7 | 0.3 | 80 | D | 20 | CuO | 2 | 875 | 22 | 4500 | −4 |
| 8 | 0.3 | 80 | D | 20 | $MnO_2$ | 2 | 875 | 22 | 4200 | −2 |
| 9 | 0.3 | 80 | D | 20 | $WO_3$ | 2 | 875 | 21 | 4100 | −4 |
| 10 | 0.3 | 80 | D | 20 | CuO | 5 | 875 | 21 | 4400 | −7 |
| 11 | 0.3 | 80 | D | 20 | CuO | 10 | 850 | 21 | 3900 | −10 |
| 12# | 0.3 | 80 | D | 20 | CuO | 15 | 825 | 20 | 1800 | −13 |
| 13 | 0.3 | 80 | D | 20 | MgO | 0.5 | 875 | 21 | 4300 | −4 |
| | | | | | NiO | 0.5 | | | | |
| | | | | | $MnO_2$ | 0.5 | | | | |
| | | | | | $WO_3$ | 0.5 | | | | |
| 14# | 0.5 | 80 | D | 20 | | 0 | 900 | 29 | 2400 | +48 |
| 15 | 0.5 | 80 | D | 20 | MgO | 2 | 875 | 28 | 2700 | +43 |
| 16# | 0.3 | 98 | D | 2 | | 0 | 1150 | 40 | 18000 | −10 |
| 17 | 0.3 | 98 | D | 2 | CuO | 5 | 1100 | 39 | 19000 | −10 |
| 18# | 0.3 | 70 | D | 30 | | 0 | 875 | 19 | 2900 | −8 |
| 19 | 0.3 | 70 | D | 30 | NiO | 2 | 850 | 19 | 3200 | −9 |
| 20# | 0.3 | 40 | D | 60 | | 0 | 850 | 14 | 1200 | −7 |
| 21 | 0.3 | 40 | D | 60 | CuO | 2 | 825 | 14 | 1500 | −7 |

# = comparative example

TABLE 3

| Sample No | Composition | | | | | | Sintering temperature °C. | Dielectric property | | |
|---|---|---|---|---|---|---|---|---|---|---|
| | Main component | | Accessory Component | | Additives | | | | | |
| | X | parts by wt. | Mark | parts by wt. | element | parts by wt. | | $\epsilon r$ | Qf product GHz | $\tau f$ ppm/°C. |
| 22# | 0.3 | 80 | A | 20 | | 0 | 1075 | 23 | 4100 | +2 |
| 23 | 0.3 | 80 | A | 20 | MgO | 2 | 1025 | 22 | 4600 | +1 |
| | | | | | NiO | 2 | | | | |
| 24# | 0.3 | 80 | B | 20 | | 0 | 875 | 20 | 2700 | +4 |
| 25 | 0.3 | 80 | B | 20 | MgO | 2 | 850 | 20 | 2900 | +3 |
| | | | | | $MnO_2$ | 2 | | | | |
| 26# | 0.3 | 80 | C | 20 | | 0 | 950 | 23 | 3900 | −2 |
| 27 | 0.3 | 80 | C | 20 | CuO | 2 | 900 | 22 | 4100 | −2 |
| | | | | | $WO_3$ | 2 | | | | |
| 28# | 0.3 | 80 | E | 20 | | 0 | 875 | 22 | 3700 | −5 |
| 29 | 0.3 | 80 | E | 20 | $MnO_2$ | 2 | 850 | 22 | 3800 | −5 |
| 30 | 0.3 | 80 | E | 20 | CuO | 2 | 800 | 21 | 4100 | −4 |
| | | | | | $WO_3$ | 2 | | | | |
| 31# | 0.3 | 80 | F | 20 | | 0 | 900 | 22 | 3800 | −3 |
| 32 | 0.3 | 80 | F | 20 | NiO | 2 | 875 | 22 | 4100 | −4 |
| 33 | 0.3 | 80 | F | 20 | CuO | 2 | 850 | 21 | 4300 | −4 |
| | | | | | NiO | 2 | | | | |
| 34# | 0.3 | 80 | G | 20 | | 0 | 950 | 24 | 4000 | −2 |
| 35 | 0.3 | 80 | G | 20 | MgO | 2 | 900 | 23 | 4300 | −2 |
| | | | | | $WO_3$ | 2 | | | | |
| 36# | 0.3 | 65 | G | 35 | | 0 | 875 | 19 | 3300 | −5 |
| 37 | 0.3 | 65 | G | 35 | MgO | 2 | 850 | 19 | 3500 | −5 |
| 38# | 0.45 | 65 | G | 35 | | 0 | 875 | 23 | 2800 | +41 |
| 39 | 0.45 | 65 | G | 35 | NiO | 1 | 850 | 22 | 3000 | +38 |
| | | | | | $MnO_2$ | 1 | | | | |

# = comparative example

The reason for limiting the composition of the main component and accessory component will be explained hereinafter. It is not preferable that X in the Formula: $Ca\{(Mg_{1/3}Nb_{2/3})_{1-x} Ti_x\}O_3$ be more than 0.5, since the temperature coefficient at a resonant frequency will be in more than +50. If the amount of accessory component is less than 2 parts by weight, the burning temperature will be above 1200° C. Consequently, the objective of the present invention is not achieved. Moreover, it is not preferable that the amount of accessory component be more than 60 parts by weight, since the Qf product will become less than 1000 GHz. Consequently, by limiting the composition of the main component and the accessory component, the dielectric ceramic composition of the present invention could be sintered at low temperatures around 1000° C.

Furthermore, there could be provided the dielectric ceramic composition having a high dielectric constant of around 25, a high Qf product of above 1000 GHz and a small temperature coefficient at a resonant frequency with the range of −50 to +50 ppm/° C.

As is apparent from Table 2 and Table 3, by adding at least one selected from the group consisting of MgO, NiO, CuO, $MnO_2$ and $WO_3$ in the amount of 0.1 parts by weight to 10 parts by weight, the dielectric ceramic composition had a low burning temperature and high Q value. In other words, a dielectric ceramic having a good microwave dielectric property could be obtained.

As shown in sample No. 12, if CuO, as a additive, was added at more than 10 parts by weight, the burning temperature could be lowered as compared with the case in which no additives was added, but at the same time Q value was also lowered. Therefore, the case of adding more than 10 parts by weight is not as desirable.

EXAMPLE 2

The method for making the main component and accessory component and examining the properties were conducted in the same manner as Example 1.

As additives, the powder of high chemical purity such as MgO, NiO, CuO, $MnO_2$, $WO_3$ were weighed so as to make the composition shown in Table 4 and 5. The additives were retained and heat treated together with the powder of accessory component for 2 hours at temperature of 500°–900° C.. After grinding fine, the additives were milled in a ball mill for 17 hours, dried and then mixed together with powder of the main component. The results were shown in Table 4 and Table 5.

TABLE 4

| Sample No | Composition | | | | | | Sintering temperature °C. | Dielectric property | | |
|---|---|---|---|---|---|---|---|---|---|---|
| | Main component | | Accessory Component | | Additives | | | | | |
| | X | parts by wt. | Mark | parts by wt. | element | parts by wt. | | εr | Qf product GHz | τf ppm/°C. |
| 40# | 0.3 | 80 | D | 20 | | 0 | 900 | 22 | 3800 | −3 |
| 41 | 0.3 | 80 | D | 20 | CuO | 0.1 | 875 | 22 | 4000 | −3 |
| 42 | 0.3 | 80 | D | 20 | MgO | 2 | 875 | 22 | 4400 | −3 |
| 43 | 0.3 | 80 | D | 20 | NiO | 2 | 875 | 22 | 4500 | −5 |
| 44 | 0.3 | 80 | D | 20 | CuO | 2 | 875 | 23 | 4700 | −4 |
| 45 | 0.3 | 80 | D | 20 | $MnO_2$ | 2 | 875 | 23 | 4300 | −2 |
| 46 | 0.3 | 80 | D | 20 | $WO_3$ | 2 | 850 | 22 | 4200 | −4 |
| 47 | 0.3 | 80 | D | 20 | CuO | 5 | 850 | 24 | 4600 | −6 |
| 48 | 0.3 | 80 | D | 20 | CuO | 10 | 825 | 25 | 4000 | −9 |
| 49# | 0.3 | 80 | D | 20 | CuO | 15 | 825 | 25 | 2200 | −15 |
| 50 | 0.3 | 80 | D | 20 | MgO | 0.5 | 850 | 24 | 4500 | −5 |
| | | | | | NiO | 0.5 | | | | |
| | | | | | $MnO_2$ | 0.5 | | | | |
| | | | | | $WO_3$ | 0.5 | | | | |
| 51# | 0.5 | 80 | D | 20 | | 0 | 900 | 29 | 2400 | +48 |
| 52 | 0.5 | 80 | D | 20 | MgO | 2 | 875 | 29 | 2900 | +42 |
| 53# | 0.3 | 98 | D | 2 | | 0 | 1150 | 40 | 18000 | −10 |
| 54 | 0.3 | 98 | D | 2 | CuO | 5 | 1100 | 41 | 22000 | −11 |
| 55# | 0.3 | 70 | D | 30 | | 0 | 875 | 19 | 2900 | −8 |
| 56 | 0.3 | 70 | D | 30 | NiO | 2 | 850 | 19 | 3400 | −10 |
| 57# | 0.3 | 40 | D | 60 | | 0 | 850 | 14 | 1200 | −7 |
| 58 | 0.3 | 40 | D | 60 | CuO | 2 | 825 | 15 | 1600 | −8 |

# = comparative example

TABLE 5

| Sample No | Composition | | | | | | Sintering temperature °C. | Dielectric property | | |
|---|---|---|---|---|---|---|---|---|---|---|
| | Main component | | Accessory Component | | Additives | | | | | |
| | X | wt. % | Mark | wt. % | element | wt. % | | εr | Qf product GHz | τf ppm/°C. |
| 59# | 0.3 | 80 | A | 20 | | 0 | 1075 | 23 | 4100 | +2 |
| 60 | 0.3 | 80 | A | 20 | MgO | 2 | 1025 | 22 | 4800 | +2 |
| | | | | | NiO | 2 | | | | |
| 61# | 0.3 | 80 | B | 20 | | 0 | 875 | 20 | 2700 | +4 |
| 62 | 0.3 | 80 | B | 20 | MgO | 2 | 825 | 21 | 3100 | +5 |
| | | | | | NiO | 2 | | | | |
| 63# | 0.3 | 80 | C | 20 | | 0 | 950 | 23 | 3900 | −2 |
| 64 | 0.3 | 80 | C | 20 | CuO | 2 | 900 | 24 | 4400 | −2 |
| | | | | | $WO_3$ | 2 | | | | |
| 65# | 0.3 | 80 | E | 20 | | 0 | 875 | 22 | 3700 | −5 |
| 66 | 0.3 | 80 | E | 20 | CuO | 2 | 825 | 23 | 4200 | −4 |
| | | | | | $WO_3$ | 2 | | | | |
| 67# | 0.3 | 80 | F | 20 | | 0 | 900 | 22 | 3800 | −3 |
| 68 | 0.3 | 80 | F | 20 | CuO | 2 | 850 | 23 | 4500 | −5 |
| | | | | | NiO | 2 | | | | |
| 69# | 0.3 | 80 | G | 20 | | 0 | 950 | 24 | 4000 | −2 |
| 70 | 0.3 | 80 | G | 20 | MgO | 2 | 900 | 25 | 4400 | −1 |
| | | | | | $WO_3$ | 2 | | | | |

# = comparative example

As is apparent from Table 4 and Table 5, by heat treating at least one selected from the group consisting of MgO, NiO, CuO, $MnO_2$ and $WO_3$ at the rate of 0.1 parts by weight to 10 parts by weight together with accessory component at temperatures of 500°–900°–C. in advance, the dielectric ceramic could be burnt at lower temperature and have a high Q value. Consequently, the dielectric ceramic having a good dielectric property and an excellent microwave property could be provided.

Moreover, the reason for limiting the composition of the main component and accessory component was same reason as Example 1. As is apparent from the sample No. 49, if CuO, as an additive, was added with more than 10 parts by weight, the burning temperature could be lowered as compared with the case when no additive were added. However, at the same time Q value was also lowered. Therefore, the case where the additives are added at 10 parts by weight or more is not as desirable.

EXAMPLE 3

The method of manufacturing the main component and accessory component, and examining the properties were conducted in the same manner as Example 1. As additives, the powder of high chemical purity, such as MgO, NiO, CuO, MnO$_2$, WO$_3$ as the additives were weighed so as to make the compositions shown in Table 6 and Table 7. The additives were melted together with the powder of the accessory component at the temperature of 1000° C.–1200° C. in the same manner as Example 1 and then quenched. Then the powder was ground fine, dried and blended together with the powder of the main component. The results were shown in the Table 6 and Table 7.

TABLE 6

| Sample No | Composition | | | | | | Sintering temperature °C. | Dielectric property | | |
|---|---|---|---|---|---|---|---|---|---|---|
| | Main component | | Accessory Component | | Additives | | | | Qf product | τf |
| | X | wt. % | Mark | wt. % | element | wt. % | | εr | GHz | ppm/°C. |
| 71# | 0.3 | 80 | D | 20 | | 0 | 900 | 22 | 3800 | −3 |
| 72 | 0.3 | 80 | D | 20 | CuO | 0.1 | 875 | 22 | 3900 | −3 |
| 73 | 0.3 | 80 | D | 20 | MgO | 2 | 875 | 23 | 4500 | −2 |
| 74 | 0.3 | 80 | D | 20 | NiO | 2 | 875 | 23 | 4500 | −5 |
| 75 | 0.3 | 80 | D | 20 | CuO | 2 | 875 | 23 | 4900 | −4 |
| 76 | 0.3 | 80 | D | 20 | MnO$_2$ | 2 | 875 | 23 | 4300 | −3 |
| 77 | 0.3 | 80 | D | 20 | WO$_3$ | 2 | 850 | 23 | 4300 | −4 |
| 78 | 0.3 | 80 | D | 20 | CuO | 5 | 850 | 24 | 4800 | −7 |
| 79 | 0.3 | 80 | D | 20 | CuO | 10 | 825 | 25 | 4200 | −9 |
| 80# | 0.3 | 80 | D | 20 | CuO | 15 | 825 | 26 | 2400 | −15 |
| 81 | 0.3 | 80 | D | 20 | MgO | 0.5 | 850 | 25 | 4600 | −6 |
| | | | | | NiO | 0.5 | | | | |
| | | | | | MnO$_2$ | 0.5 | | | | |
| | | | | | WO$_3$ | 0.5 | | | | |
| 82# | 0.5 | 80 | D | 20 | | 0 | 900 | 29 | 2400 | +48 |
| 83 | 0.5 | 80 | D | 20 | MgO | 0.2 | 875 | 30 | 3000 | +41 |
| 84# | 0.3 | 98 | D | 2 | | 0 | 1150 | 40 | 18000 | −10 |
| 85 | 0.3 | 98 | D | 2 | CuO | 5 | 1100 | 42 | 24000 | −12 |
| 86# | 0.3 | 70 | D | 30 | | 0 | 875 | 19 | 2900 | −8 |
| 87 | 0.3 | 70 | D | 30 | NiO | 2 | 850 | 20 | 3600 | −9 |
| 88# | 0.3 | 40 | D | 60 | | 0 | 850 | 14 | 1200 | −7 |
| 89 | 0.3 | 40 | D | 60 | CuO | 2 | 825 | 16 | 1800 | −8 |

\# = comparative example

TABLE 7

| Sample No | Composition | | | | | | Sintering temperature °C. | Dielectric property | | |
|---|---|---|---|---|---|---|---|---|---|---|
| | Main component | | Accessory Component | | Additives | | | | Qf product | τf |
| | X | wt. % | Mark | wt. % | element | wt. % | | εr | GHz | ppm/°C. |
| 90# | 0.3 | 80 | A | 20 | | 0 | 1075 | 23 | 4100 | +2 |
| 91 | 0.3 | 80 | A | 20 | MgO | 2 | 1025 | 24 | 4900 | +2 |
| | | | | | NiO | 2 | | | | |
| 92# | 0.3 | 80 | B | 20 | | 0 | 875 | 20 | 2700 | +4 |
| 93 | 0.3 | 80 | B | 20 | MgO | 2 | 825 | 23 | 3100 | +4 |
| | | | | | MnO$_2$ | 2 | | | | |
| 94# | 0.3 | 80 | C | 20 | | 0 | 950 | 23 | 3900 | −2 |
| 95 | 0.3 | 80 | C | 20 | CuO | 2 | 900 | 25 | 4500 | −2 |
| | | | | | WO$_3$ | 2 | | | | |
| 96# | 0.3 | 80 | E | 20 | | 0 | 875 | 22 | 3700 | −5 |
| 97 | 0.3 | 80 | E | 20 | CuO | 2 | 825 | 24 | 4400 | −5 |
| | | | | | WO$_3$ | 2 | | | | |
| 98# | 0.3 | 80 | F | 20 | | 0 | 900 | 22 | 3800 | −3 |
| 99 | 0.3 | 80 | F | 20 | CuO | 2 | 850 | 23 | 4700 | −3 |
| | | | | | NiO | 2 | | | | |
| 100# | 0.3 | 80 | G | 20 | | 0 | 950 | 24 | 4000 | −2 |
| 101 | 0.3 | 80 | G | 20 | MgO | 2 | 900 | 25 | 4600 | −2 |
| | | | | | WO$_3$ | 2 | | | | |

\# = comparative example

As is apparent from Table 6 and Table 7, by heat treating at least one selected from the group consisting of MgO, NiO, CuO, $MnO_2$ and $WO_3$ at the rate of 0.1 parts by weight to 10 parts by weight together with the accessory component, the dielectric ceramic could have lower sintering temperature and improve the Q value and have a high dielectric constant. Consequently, there could be provided the dielectric ceramic having good property and excellent microwave property.

Moreover, the reason for limiting the composition of the main component and accessory component was the same reason as Example 1. As is apparent from sample No. 80, if CuO, as an additive, was added at more than 10 parts by weight, the burning temperature could be lowered as compared with the case when no additive were added, but at the same time, the Q value was also lowered. Therefore, adding the additives in the amount of more than 10 parts by weight is not as desirable.

EXAMPLE 4

In Example 4 is described a preferred embodiment to illustrate the high frequency device of the present invention.

Figure 2:
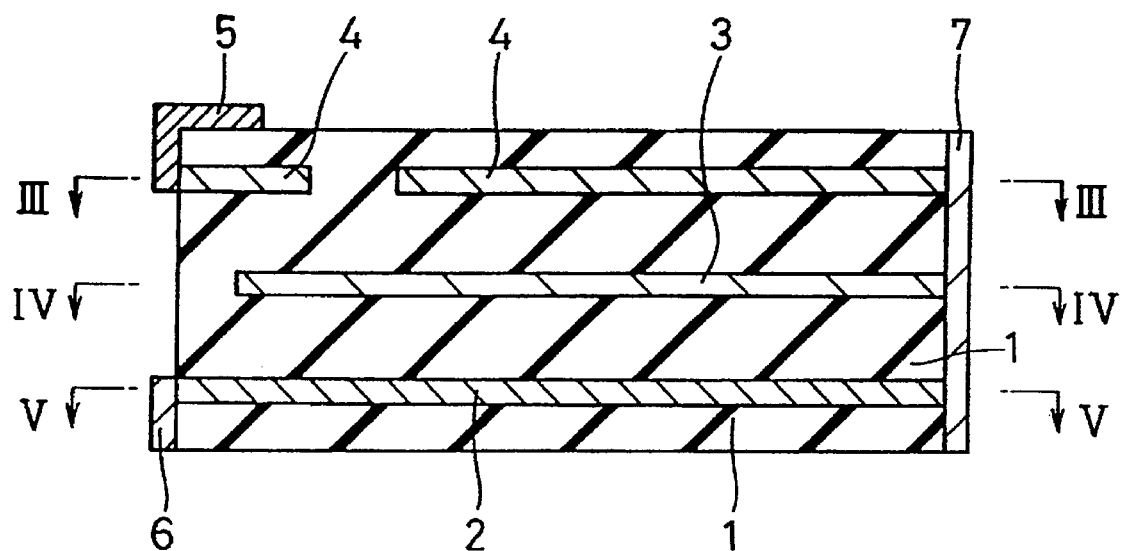
FIG. 2 is a cross sectional view taken on line I—I of FIG. 1.
Figure 3:
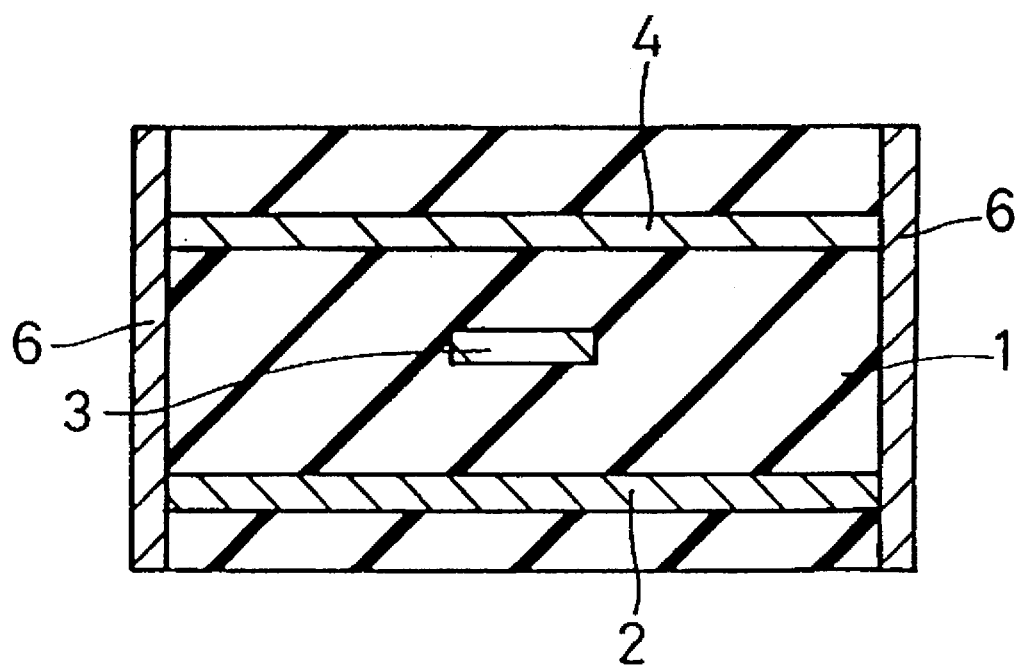
FIG. 3 is a cross sectional view taken on line II—II of FIG. 1.
Figure 4A:
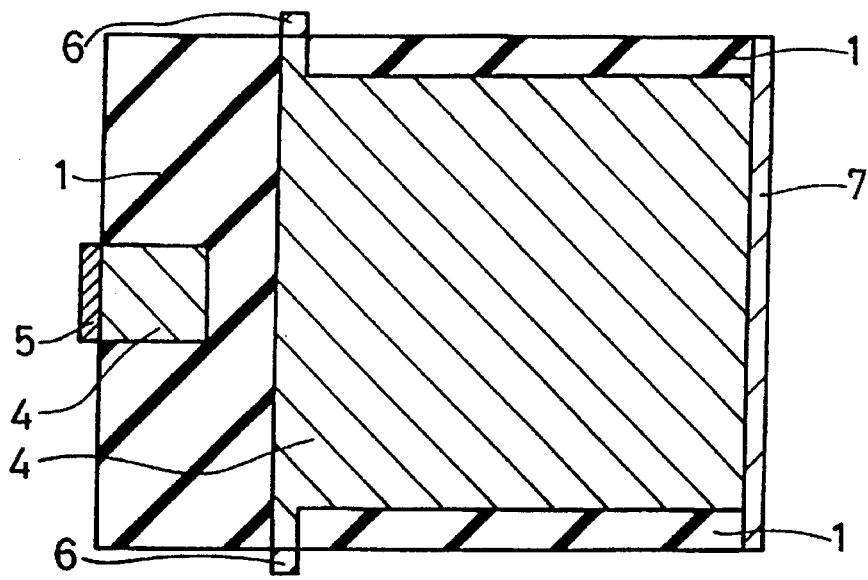
FIG. 4A is a cross sectional view taken on line III—III of FIG. 2.
Figure 4B:
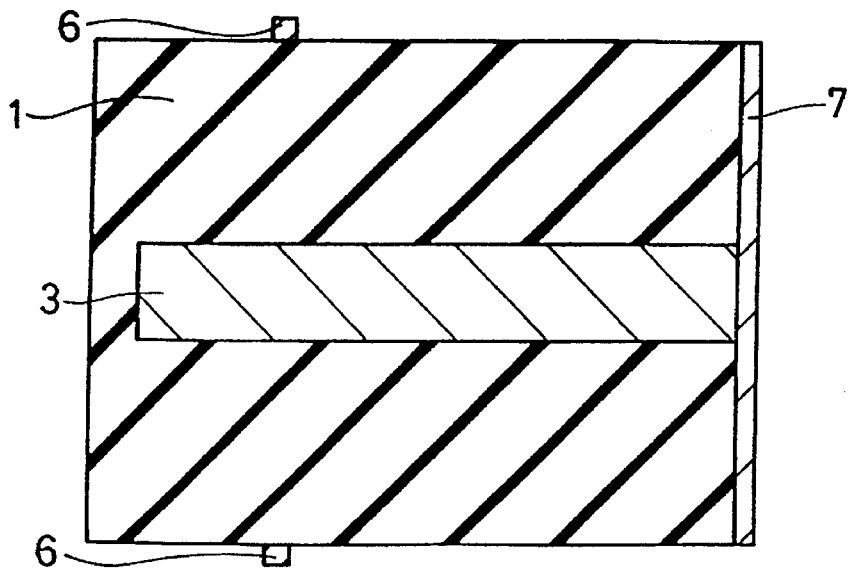
FIG. 4B is a cross sectional view taken on line IV—IV of FIG. 2
Figure 4C:
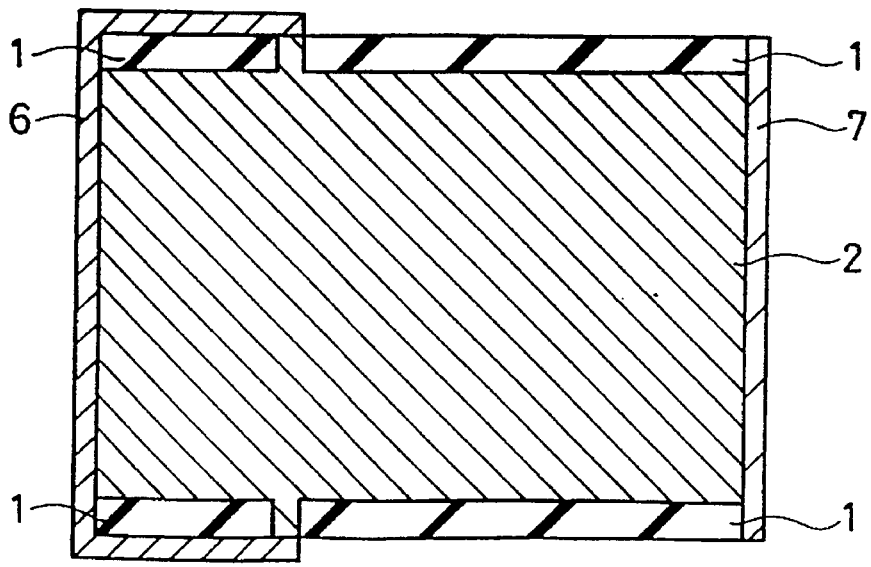
FIG. 4C is a cross sectional view taken on line V—V of FIG. 2.

As a multilayer high frequency device, a dielectric resonator was made. The dielectric resonator has a structure in which a stripline conductor is covered with a dielectric layer and a shield conductor and a capacitor for binding are included. FIG. 1 is a perspective view of the device. FIG. 2 is a cross sectional view taken on line I—I of FIG. 1. FIG. 3 is a cross sectional view taken on line II—II of FIG. 1. FIG. 4A is a cross sectional view taken on line III—III of FIG. 2. FIG. 4B is a cross sectional view taken on line IV—IV of FIG. 2. FIG. 4C is a cross sectional view taken on line V—V of FIG. 2. Herein, 1 shows a dielectric layer; 2, 3 and 4 show internal conductors; 5, 6,and 7 show external electrodes. Following is the method for manufacturing the high frequency device.

First, organic binder, solvent and plasticizer were added and mixed in the composition of sample No. 10 of Table 2. The mixed slurry was formed into a sheet by the doctor blade method. As a conductive metal, various metals shown in Table 8 were selected. The metals were mixed with vehicle to make into paste. In the case where the conductor was Cu, CuO paste was used.

TABLE 8

| conductive electrode | resonant frequency GHz | no-load Q |
|---|---|---|
| Cu | 2.04 | 180 |
| Ag | 2.01 | 180 |
| 99Ag—1Pt | 2.00 | 170 |
| Au | 2.02 | 175 |

Other sheets were made from the composition of sample No. 47 of Table 4 and that of sample No. 78 of Table 6 by the same method.

TABLE 9

| conductive electrode | resonant frequency GHz | no-load Q |
|---|---|---|
| Cu | 2.01 | 185 |
| Ag | 1.99 | 190 |

TABLE 9-continued

| conductive electrode | resonant frequency GHz | no-load Q |
|---|---|---|
| 99Ag—1Pt | 1.99 | 175 |
| Au | 2.00 | 180 |

TABLE 10

| conductive electrode | resonant frequency GHz | no-load Q |
|---|---|---|
| Cu | 2.00 | 190 |
| Ag | 1.99 | 190 |
| 99Ag—1Pt | 1.98 | 180 |
| Au | 2.00 | 185 |

A plurality of sheets were layered, and then the conductive pattern 2 of FIG. 4 was screen printed thereon. A further plurality of sheets were layered thereon, and then the conductive pattern 3 was printed thereon. A further plurality of sheets were further layered thereon, and then the conductive pattern 4 was printed thereon. A further plurality of sheets were layered thereon, which were pressed by a heat pressing method. After cutting it into individual devices, the devices were heat treated in the air to flash the binder. In the case that CuO paste was used, the conductor was heat treated in $H_2$ for reducing to Cu and then burned in $N_2$. In the case that another conductor was used, the conductor was burned in the air. The burning temperature was 900° C.

The external electrodes 5, 6, and 7 were burned in the air, and Cu was burnt in $N_2$ so that a multilayer dielectric resonator was obtained.

After burning, the size of device was 8 mm in length, 4.5 mm in width, and 2.5 mm in height. The conductor, a strip line, was 1 mm wide and 7 mm long.

Ten devices were made per each conductor and the average value was taken as the property. The resonant frequency and the Q value of the obtained resonator are shown in Table 8, 9 and 10.

As seen in in Table 8, 9 and 10, the resonant frequency of resonator were approximately 2.0 GHz and the Q values are high when any of Cu, Au, Ag and alloys of them were used, thus showing excellent properties. Since the dielectric constant of the conventional substrate materials was approximately 8, in order to obtain the resonator which has the same structure and same resonant frequency, the length of the strip line is required to be approximately 12 mm. However, the dielectric constant of the dielectric of the present invention was from 21 to 24, so that the length of the strip line was 7 mm. Consequently, the miniature device could be provided.

Moreover, by making the strip line in a curved or layered form, a smaller resonant device could be provided. In addition, by combining a plurality of resonators and capacitors, a band-pass filter could be provided.

Furthermore, other than the elements described above, any elements that have no harmful effect on the dielectric properties may be included.

As stated above, according to the dielectric ceramics of the present invention, wherein: the main component comprising calcium oxide, magnesium oxide, niobium oxide and titanium oxide and expressed by the Formula: $Ca\{(Mg_{1/3}Nb_{2/3})_{1-x}Ti_x\}O_3$ (wherein X is more than 0 nor more than 0.50) is present within the range of not less than 40 parts by weight nor more than 98 parts by weight; the accessory component comprising at least one selected from $SiO_2$ and $B_2O_3$ is present within the range of not less than 2 parts by weight nor less than 60 parts by weight; and at least one oxide selected from the group consisting of MgO, NiO, CuO, $MnO_2$ and $WO_3$ is present within the range of not less than 0.1 parts by weight nor less than 10 parts by weight; there can be provided the dielectric ceramic compositions that can be sintered at a low temperature and are stable in composition and have a higher Q value. In other words, since $Ca\{(Mg_{1/3}Nb_{2/3})_{1-x}Ti_x\}O_3$ having an excellent microwave dielectric property is used as the main component and glass components that improve the sintering are contained as the accessory component, the dielectric ceramic that can be sintered around 1000° C. and have a high dielectric constant, a high Q value and a small temperature coefficient at a resonant frequency can be provided. Moreover, $Bi_2O_3$ is not included in the main components so that the dielectric ceramic is stable in composition and also in the dielectric property with respect to the burning temperature. Consequently, the use of the dielectric ceramic of the present invention permits miniaturizing and improving the function of high frequency devices such as filters and resonators.

According to the method for manufacturing the dielectric ceramic composition of the present invention, the dielectric ceramic composition can be effectively and reasonably manufactured. Moreover, according to the dielectric ceramic composition of the present invention, there can be provided the dielectric ceramic having a low burning temperature, high Q value, a high dielectric constant of around 25 and a small temperature coefficient at a resonant frequency ($\tau_r$). As a result, a multilayer resonant device in which Cu, Au or Ag are used for an internal conductor can be provided. The miniature and highly performance resonator could provide a miniature and high performance automobile phone or portable phone. Moreover, the dielectric ceramic of the present invention can be used for not only a resonant device but also a microwave circuit substrate or multilayer ceramic capacitor. Consequently, the dielectric ceramics of the present invention can be valuable for industrial purposes.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A dielectric ceramic composition comprising a main component of calcium oxide, magnesium oxide, niobium oxide and titanium oxide represented by the formula:

$$Ca\{(Mg_{1/3}Nb_{2/3})_{1-x}Ti_x\}O_3$$

wherein 0<x<0.50, said main component being present within a range of 40 to 98 parts by weight; an accessory component comprising at least one element selected from the group consisting of $SiO_2$ and $B_2O_3$, said accessory component being present within a range of 2 to 60 parts by weight; and an additive comprising at least one oxide selected from the group consisting of MgO, NiO, CuO, $MnO_2$ and $WO_3$, said additive being present within a range of 0.1 to 10 parts by weight.

2. A dielectric ceramic composition according to claim 1 having a dielectric constant ranging from 10 to 50.

3. A dielectric ceramic according to claim 1 having a Qf product ranging from 1000 to 30,000 GHz.

4. A multi-layer high frequency device comprising a conductor and a dielectric layer, wherein the conductor comprises a metal selected from the group consisting of Cu, Au, Ag, and alloys thereof and at least part of the dielectric layer comprises a main component of calcium oxide, magnesium oxide, niobium oxide and titanium oxide represented by the formula:

$$Ca\{(Mg_{1/3}Nb_{2/3})_{1-x}Ti_x\}O_3$$

wherein 0<x<0.50, said main component being present within a range of 40 to 98 parts by weight; an accessory component comprising at least one element selected from the group consisting of $SiO_2$ and $B_2O_3$, said accessory component being present within a range of 2 to 60 parts by weight; and an additive comprising at least one oxide selected from the group consisting of MgO, NiO, CuO, $MnO_2$ and $WO_3$, said additive being present within a range of 0.1 to 10 parts by weight.

5. A multi-layer high frequency device according to claim 4 having a dielectric constant ranging from 10 to 50.

6. A multi-layer high frequency device according to claim 4 having a Qf product ranging from 1000 to 30,000 GHz.

* * * * *